May 31, 1960     W. P. MASON     2,939,106
HIGH FREQUENCY ELECTROMECHANICAL TRANSDUCER
Filed Oct. 6, 1943
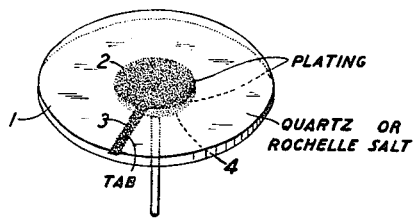
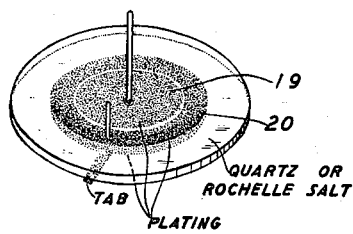
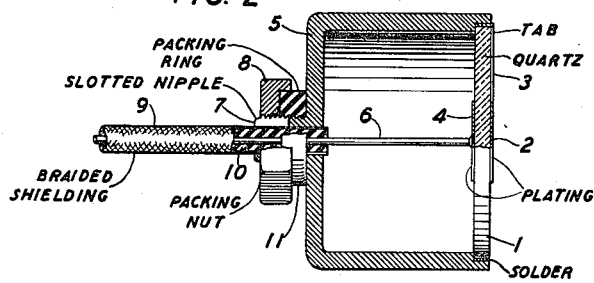
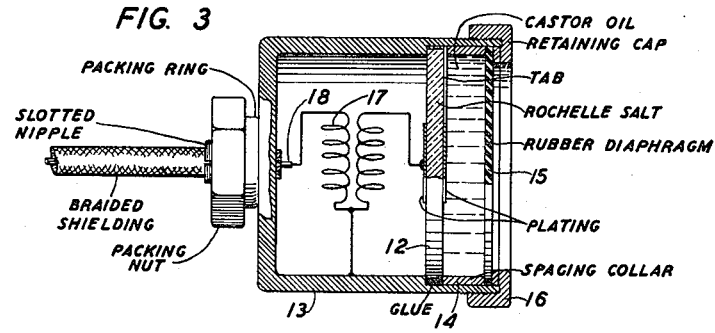
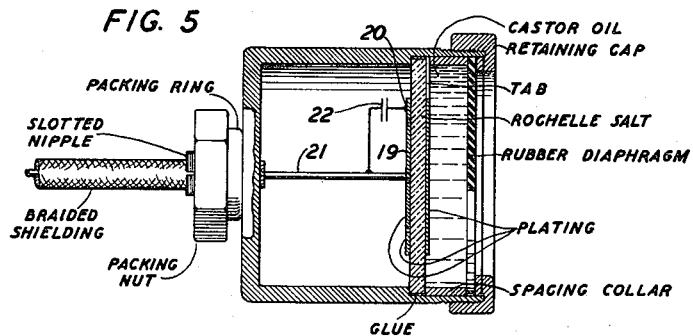
INVENTOR
W. P. MASON
BY
ATTORNEY United States Patent Office 2,939,106
Patented May 31, 1960

2,939,106
HIGH FREQUENCY ELECTROMECHANICAL TRANSDUCER

Warren P. Mason, West Orange, N.J., assignor to Bell Telephone Laboratories, Incorporated, New York, N.Y., a corporation of New York Filed Oct. 6, 1943, Ser. No. 505,160

4 Claims. (Cl. 340—10)

This invention relates to electromechanical transducers and particularly to piezoelectric transducers for working in the megacycle ranges.

The object of the invention is to provide a transducer whose active element is in the form of a piezoelectric crystal for subaqueous employment at a frequency measured in the megacycle range.

Hydrophones and receivers useful for submarine detection, ranging and signaling in the ultrasonic ranges are well known but in the frequency spectrum these devices are far below the devices herein set forth and the construction thereof poses radically different problems. In accordance with the present invention a thickness vibrating crystal must be used and in order to properly control the current in such high frequency range the crystal must be placed substantially at right angles to the longitudinal direction of the conductor which supplies it with power. Hence the crystal is mounted in such a manner as to constitute a termination of a coaxial conductor. The thickness vibrating crystal is in the form of a thin circular plate secured at its edge to a cylindrical housing and provided with an outer conducting surface considerably smaller than the total area thereof and electrically connected to the said housing and an inner conducting surface of the same dimension connected to a centrally disposed conductor. The said housing comprises a cup-shaped extension of the outer conductor of a coaxial transmission line.

Where such a transducer is to be used for subaqueous transmission the crystal may be formed of quartz and exposed directly to the sea water. If a Rochelle salt crystal is to be employed it must be protected from the sea water by a layer of non-corrosive liquid which may be retained by a thin diaphragm of rubber or other material having the same mechanical impedance as the sea water and the non-corrosive liquid or which will form a good match between the two.

A feature of the invention is an electromechanical transducer for use in the megacycle ranges employing a piezoelectric crystal as the moving element thereof.

Another feature is the use of a thickness vibrating crystal constructed and arranged to respond to a single frequency.

Another feature is a transducer in the form of a coaxial conductor termination.

Still another feature is a crystal arranged to vibrate in the direction of the conductor by which it is supplied with power.

Another feature of the invention is a cup-shaped termination of a coaxial conductor having a crystal mounted in the end thereof with its principal face normal to the longitudinal axis of the said cup-shaped device.

Other features will appear hereinafter.

The drawings consist of a single sheet having five figures, as follows:

Fig. 1 is a perspective view showing the general shape of the piezoelectric crystal and the comparative extent and location of the electrodes;

Fig. 2 is a side view partly in section of a transducer showing the construction thereof and the connections thereto suitable for use in the extremely high frequencies for which it may be employed;

Fig. 3 is a similar view, showing by means of a circuit diagram how a matching transformer may be included within the casing of the transducer and showing the modified construction which will be used where the crystal is subject to attack by water;

Fig. 4 is a view similar to that of Fig. 1 showing how the interior plating of the crystal may be divided into two areas connected by a condenser, the proportions of which and the reasons therefor being fully explained hereinafter; and Fig. 5 is a view similar to Figs. 2 and 3 showing by means of a circuit diagram how the condenser is connected to the electrodes of the crystal of Fig. 4.

The electromechanical transducers of the present invention are arranged for working in very high frequency ranges, which may generally be described as the megacycle ranges. Here it is necessary to employ thickness vibrating crystals, such for instance as the crystal described by Cady as the L-cut crystal ("The Longitudinal Piezoelectric Effect in Rochelle-Salt Crystals" by Walter G. Cady in the proceedings of the Physical Society, volume 49, part 6, November 1, 1937). This is a Rochelle salt crystal so cut that the normal makes equal angles with the three crystallographic axes. Other crystals of quartz or ammonium dihydrogen phosphate appropriately cut may be employed. If such crystals are cut in a circular form and the electrodes are confined to centrally located small areas they will have a single continuous frequency range free from secondary modes.

If a crystal is cut circularly and plated all over, the thickness vibration is set up but also all the contour modes are excited and since a number of these will fall into the vast region of the thickness mode, they will cause considerable irregularity in the response. In measuring the resonances of the thickness vibratory plates, however, it has been found that the secondary modes are much reduced with respect to the resonated mode if the crystal is plated only near the center and not near the edges as shown in Fig. 1. Here the circular plate 1 indicates the crystal and the central area 2 and the tab 3 indicate the electrode plated thereon. A circular area 4 on the underside face of the crystal 1 indicates the other electrode. The reason for this behavior of the crystal is apparently due to the fact that the coupling between modes comes at the boundary of the crystal near the edges, and if their boundary is not excited by plating near the edges the secondary resonances will not be excited.

To make use of this fact a unit constructed as in Fig. 2 can be used. Here a quartz plate 1 is metallized on the edges and soldered into a metal cup 5, making a hermetic seal against the water in which the transducer will be immersed. The crystal is plated only at the center as indicated in Fig. 1 and the exterior surface has a tab 3 extending to and soldered to the frame 5. The terminals of the transducer comprise a shielded conductor or coaxial pair made necessary by the high frequency current to be handled. The central conductor 6 of this coaxial pair may be soldered directly to the inner plated surface 4 or may be connected thereto by a short flexible conductor, the body portion afterwards being slipped along the shielded conductor until the crystal is properly seated after which the packing nut 8 may be tightened and the soldering operation to secure the crystal in its seat performed. The body 5 at the side opposite the open end in which the crystal is soldered terminates in a slotted nipple 7 whereby through the use of a packing nut 8 the outer conductor or braided shielding 9 of the coaxial pair is firmly gripped and a water-tight junction is formed. The rubber insulation 10 between the inner conductor 6 and the outer conductor 9 and a packing ring 11 insure such a watertight junction. The crystal in such a transducer will be excited only over the portion that is plated and will give a uniform response over the pass band of the device.

For a Rochelle salt crystal, the construction shown in Fig. 3 has to be used since Rochelle salt is soluble in water. Here the crystal 12 is glued into the cap 13 and held in place by a washer or spacing collar 14. This in turn is held in place by the rubber diaphragm 15 and the retaining cap 16. The space between the diaphragm 15 and the crystal 12 is filled with some non-corrosive liquid such as castor oil or a mixture of dimethyl phthalate and xylene hexafluoride which has a mechanical impedance equal to that of sea water. The rubber diaphragm may be made of pure gum rubber which has been found to have the same mechanical impedance as sea water and at high frequencies to offer less attenuation than other substances heretofore used as diaphragms such as certain commercial rubber compounds which have been produced having certain desirable characteristics.

Fig. 3 also shows how a small transformer 17 may be placed within the casing 13 and connected between the inner electrode of the crystal and the central conductor 18 to match the impedance of the crystal to the outgoing conductor.

Another use for the reduced plating on the crystal is in obtaining a radiator with small side lobes. This can be accomplished by the plating arrangement shown in Figs. 4 and 5. Here the outside is plated at the central portion, but the inside plating is divided into an inner circular portion 19 of width $w$ and a surrounding ring 20 of width $w/2$. The inside portion 19 is connected directly to the driving wire 21 and is driven at full amplitude. The outer ring 20 is connected to the driving wire 21 through a condenser 22 having a value equal to the static capacity of the outer ring 20. As a result, the outer ring 20 gets only half the voltage that is applied to the inner plate 19 and is driven at only half the amplitude. It is well known that for such an arrangement, the secondary lobes are down 25 decibels with respect to the primary lobes.

Various combinations other than those specifically shown may be made in accordance with the characteristics of the elements used and the service to which the transducers will be put.

What is claimed is:

1. An electromechanical transducer for use in a frequency range above 100,000 cycles comprising a cylindrical metallic housing forming one terminal thereof, a centrally located axial conductor forming the other terminal thereof, a thin circular thickness vibrating piezoelectric crystal secured to the open end of said housing with its faces normal to the longitudinal axis of said housing, a transformer for matching the impedance of said crystal to the impedance of said centrally located conductor mounted within said housing, electrodes for said crystal secured to the interior and exterior surfaces of said crystal, the said exterior surface electrode being connected to said housing and the said interior surface electrode being connected through said transformer to said centrally located conductor, said electrodes being substantially less in area than the said crystal faces.

2. An electromechanical transducer for use in a frequency range above 100,000 cycles, comprising a cylindrical metallic housing forming one terminal thereof, a centrally located axial conductor forming the other terminal thereof, a thin circular thickness vibrating Rochelle salt crystal mounted in said housing with its faces normal to the longitudinal axis of said housing, electrodes for said crystal secured to the interior and exterior surfaces thereof, the said exterior surface electrode being connected to said housing and the said interior surface electrode being connected to said centrally located conductor, a thin rubber diaphragm being secured to the open end of said housing and the space within said housing between the exterior surface of said crystal and said diaphragm being filled with non-corrosive liquid.

3. An electromechanical transducer for use in a frequench range above 100,000 cycles comprising a cylindrical metallic housing forming one terminal thereof, a centrally located axial conductor forming the other terminal thereof, a thin circular thickness vibrating piezoelectric crystal secured to the open end of said housing with its faces normal to the longitudinal axis of said housing, electrodes for said crystal secured to the interior and exterior surfaces thereof, the said exterior surface electrode being circular in shape of substantially less area than the area of the said face and connected to said housing, the said interior surface electrode being in two parts, a first part shaped like the said exterior surface electrode concentrically arranged therewith and connected to said centrally located conductor and a second part being in the form of an annular ring surrounding said first part and connected to said centrally located conductor through a condenser, said condenser being mounted within said housing.

4. An electromechanical transducer for use in a frequency range above 100,000 cycles comprising a thickness vibrating crystal mounted in a concentric conductor system in which an inner conductor is surrounded by a cylindrical conductor concentric therewith and acting as a return therefor, a coaxial termination therefor comprising an expanded cylindrical shell having said crystal mounted in the end thereof opposite to the connection thereof to the said cylindrical conductor, said crystal having its faces normal to the axis of said cylindrical shell, and electrodes on the faces of said crystal one connected to said inner conductor and the other connected to said shell.

References Cited in the file of this patent

UNITED STATES PATENTS

| | | |
|---|---|---|
| 2,030,178 | Potter | Feb. 11, 1936 |
| 2,086,891 | Bachmann et al. | July 13, 1937 |
| 2,096,826 | Schrader | Oct. 26, 1937 |
| 2,190,713 | Hintze et al. | Feb. 20, 1940 |
| 2,248,870 | Langevin | July 8, 1941 |
| 2,249,933 | Bechmann | July 22, 1941 |

FOREIGN PATENTS

| | | |
|---|---|---|
| 307,381 | Great Britain | Mar. 6, 1929 |